United States Patent
Shen

(10) Patent No.: US 9,118,497 B2
(45) Date of Patent: Aug. 25, 2015

(54) METHOD FOR MOUNTING NETWORK ATTACHED STORAGE NAS DEVICE, AND DIGITAL MEDIA PLAYER DMP

(75) Inventor: Guohua Shen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 498 days.

(21) Appl. No.: 13/482,337

(22) Filed: May 29, 2012

(65) Prior Publication Data

US 2012/0303769 A1 Nov. 29, 2012

Related U.S. Application Data

(63) Continuation of application No. PCT/CN2011/074681, filed on May 26, 2011.

(51) Int. Cl.
*G06F 15/177* (2006.01)
*H04L 12/28* (2006.01)
*H04L 29/08* (2006.01)

(52) U.S. Cl.
CPC ........ *H04L 12/2809* (2013.01); *H04L 67/1097* (2013.01)

(58) Field of Classification Search
None
See application file for complete search history.

(56) References Cited

U.S. PATENT DOCUMENTS

| 7,881,315 | B2* | 2/2011 | Haveson et al. | 370/401 |
| 2006/0117132 | A1* | 6/2006 | Gray et al. | 711/100 |
| 2008/0270574 | A1* | 10/2008 | Hanes | 709/219 |
| 2010/0125907 | A1* | 5/2010 | Jonsson | 726/18 |
| 2011/0153775 | A1* | 6/2011 | Yanashima | 709/217 |
| 2012/0233651 | A1* | 9/2012 | Lee et al. | 725/110 |

FOREIGN PATENT DOCUMENTS

| CN | 1921518 | 2/2007 |
| CN | 101030980 | 9/2007 |
| CN | 101119247 | 2/2008 |

(Continued)

OTHER PUBLICATIONS

Andreas Fasbender et al., "Virtually at home: High-performance access to personal media", Ericsson Review, vol. 2, 2008, pp. 58-63.

(Continued)

*Primary Examiner* — Joshua Joo
(74) *Attorney, Agent, or Firm* — Staas & Halsey LLP

(57) ABSTRACT

A method for mounting a network attached storage (NAS) device, and a digital media player are provided, which includes broadcasting a discovery message for searching a network attached storage NAS device; parsing a configuration response message, which is sent by the NAS device according to the discovery message, and obtaining configuration information of the NAS device; and mounting the NAS device according to the configuration information. According to the present invention, the automatic mounting of the NAS device is realized by discovering and obtaining the configuration information of the NAS device in the network, and personally-recorded-video-contents or downloaded media contents, where the personally-recorded-video-contents or the downloaded media contents are stored in the NAS device, can be played according to the selection of a user in the case that local data storage is not supported, so as to enable a digital home user to obtain a better user experience.

8 Claims, 4 Drawing Sheets

(56) References Cited

FOREIGN PATENT DOCUMENTS

| | | |
|---|---|---|
| WO | 2008/027730 | 3/2008 |
| WO | 2009/102250 | 8/2009 |

OTHER PUBLICATIONS

UPnP Forum, "UPnP Device Architecture 1.1", XP-002521470, Oct. 2008, pp. i-vi, 1-129.

Extended European Search Report dated Jun. 25, 2012 issued in corresponding European Patent Application No. 11783004.2.
*UPnP Device Architecture 1.0,* 2008 UPnP Forum, pp. 1-77.
International Search Report, dated Mar. 1, 2012, in corresponding International Application No. PCT/CN2011/074681 (4 pp.).
First Office Action, dated Nov. 20, 2012, in corresponding Chinese Application No. 201180000756.0 (9 pp.).

* cited by examiner

METHOD FOR MOUNTING NETWORK ATTACHED STORAGE NAS DEVICE, AND DIGITAL MEDIA PLAYER DMP

CROSS-REFERENCE TO RELATED APPLICATIONS

This application is a continuation of International Application No. PCT/CN2011/074681, filed on May 26, 2011, which is hereby incorporated by reference in their entireties.

FIELD OF THE INVENTION

The present invention relates to a method for mounting a network attached storage (NAS) device, and a digital media player (DMP), and belongs to the field of network communications technologies.

BACKGROUND OF THE INVENTION

Multimedia-related entertainment services are the most important needs of the digital home, for example, services such as download of Internet videos and music are widely used in a common home. The DLNA (Digital Living Network Alliance, digital living network alliance) proposes setting a DMS (Digital Media Server, digital media server) device in a home according to an interconnection standard for sharing various media data in the home, and provides media sharing service capability to a DMP (Digital Media Player, digital media player) device through a home network, and the DMP device may upload corresponding media contents to the DMS, or download corresponding media contents from the DMS, or play corresponding media contents in the DMS. In a scenario defined by the DLNA, the used protocol is UPnP (Universal Plug and Play, universal plug and play), and the UPnP protocol solves mutual discovery of devices, content directory browse, connection management, and audio and video transmission management.

The IPTV (Internet Protocol Television, internet protocol television) is also common in a digital home application solution, and recording and download of contents in an IPTV network is also a main way for obtaining entertainment multimedia contents in the digital home. Its an application scenario is a PVR (Personal Video Recorder, personal video recorder) type STB (Set-top Box, set-top box) records or downloads the IPTV contents locally, which may be played again locally if needed. When the PVR type STB is combined with the DMS, devices such as a STB, a computer, and a hand-held terminal that are in other rooms can share the video contents in the PVR type STB. That is to say, in the prior art, local recording is performed, and local playing that is not based on the capability of the IPTV system needs to realized, so only a STB having a hard disk can support the local recording or download. Moreover, due to the main function of the STB is to play multimedia contents, the function requirement of content sharing can be meet when the STB is in working. However, the STB is not a professional storage device, and cannot meet the requirement of content sharing of other devices in the home network anytime and anywhere.

SUMMARY OF THE INVENTION

Embodiments of the present invention provide a method for mounting a network attached storage (NAS) device, and a digital media player, so as to realize automatic mounting of the NAS device, realize a personal video recording or download service in the case that local data storage is not supported, and improve experience of a digital home user.

An embodiment of the present invention provides a method for mounting a network attached storage NAS device, where the method includes:

broadcasting, by a digital media player DMP, in a network a discovery message for searching a network attached storage NAS device;

parsing, by the DMP, a configuration response message, which is sent by the NAS device according to the discovery message, and obtaining configuration information of the NAS device; and mounting, by the DMP, the NAS device according to the configuration information.

An embodiment of the present invention provides a digital media player DMP, where the DMP includes:

a device searching unit, configured to broadcast, in a network, a discovery message for searing a network attached storage NAS device;

a first message parsing unit, configured to parse a configuration response message, which is sent by the NAS device according to the discovery message, and obtain configuration information of the NAS device; and a first device mounting unit, configured to mount the NAS device according to the configuration information.

An embodiment of the present invention provides a method for mounting a network attached storage NAS device, where the method includes:

monitoring, by a digital media player DMP, whether a broadcast message sent by a network attached storage NAS device exists in a network, and sending a response message to the NAS device if the broadcast message sent by the NAS device in the network is received;

parsing, by the DMP, a configuration response message sent by the NAS device according to the discovery message, and obtaining configuration information of the NAS device; and mounting, by the DMP, the NAS device according to the configuration information.

An embodiment of the present invention provides a digital media player DMP, where the DMP includes:

a device monitoring unit, configured to monitor whether a broadcast message sent by a network attached storage NAS device exists in a network, and send a response message to the NAS device if the broadcast message sent by the NAS device in the network is received;

a second message parsing unit, configured to parse a configuration response message, which is sent by the NAS device according to the discovery message, and obtain configuration information of the NAS device; and a second device mounting unit, configured to mount the NAS device according to the configuration information.

It can be seen from the foregoing technical solutions according to the embodiments of the present invention that the automatic mounting of the NAS device is realized by discovering and parsing the configuration information of the NAS device in the network, and personally-recorded video contents or downloaded media contents, where the personally-recorded video contents or the downloaded media contents are stored in the NAS device, can be played according to the selection of a user in the case that local data storage is not supported, so as to enable a digital home user to obtain a better user experience.

BRIEF DESCRIPTION OF THE DRAWINGS

To illustrate the technical solutions according to the embodiments of the present invention more clearly, accompanying drawings required for describing the embodiments are introduced briefly in the following. Apparently, the accompanying drawings in the following description are only some embodiments of the present invention, and persons of ordinary skill in the art may further obtain other drawings according to these accompanying drawings without creative efforts.

DETAILED DESCRIPTION OF THE EMBODIMENTS

The technical solutions according to the embodiments of the present invention are clearly and completely described in the following with reference to the accompanying drawings in the embodiments of the present invention. Obviously, the embodiments to be described are only part of rather than all of the embodiments of the present invention. All other embodiments obtained by persons of ordinary skill in the art based on the embodiments of the present invention without creative efforts shall fall within the protection scope of the present invention.

Figure 1:
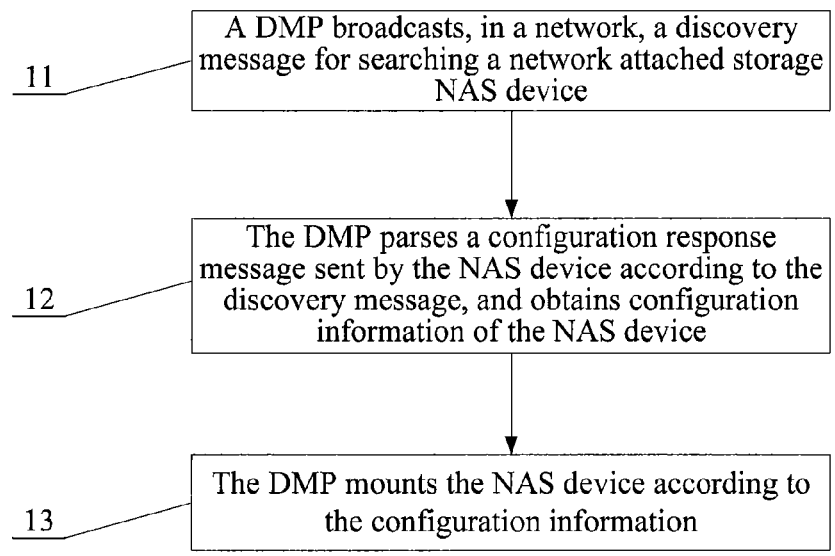
FIG. 1 is a schematic flow chart of a method for mounting a NAS device according to an embodiment of the present invention.

An embodiment of the present invention provides a method for mounting a network attached storage NAS device, where the method includes broadcasting, by a digital media player DMP, in a network a discovery message for searching a network attached storage NAS device; parsing, by the DMP, a configuration response message sent by the NAS device according to the discovery message, and obtaining configuration information of the NAS device; and mounting, by the DMP, the NAS device according to the configuration information. By using the method, an existing DMP that does not support file storage automatically mounts the NAS device through a network file system, so as to realize personal video recording or download application in an IPTV. In this embodiment, the corresponding NAS device may be a storage device that exists in the network and is used by other devices, and generally provides a standard network file service (for example, samba, NFS and so on). The corresponding DMP device may be a device that is connected to a home gateway and provides media content sharing to a home network, and in this embodiment, a STB that does not support a PVR is used as the DMP device for description. The embodiment is specifically described below with reference to an accompanying drawing in the specification. As shown in FIG. 1, the method may include:

Step 11: A DMP broadcasts, in a network, a discovery message for searching a network attached storage NAS device.

Figure 2:
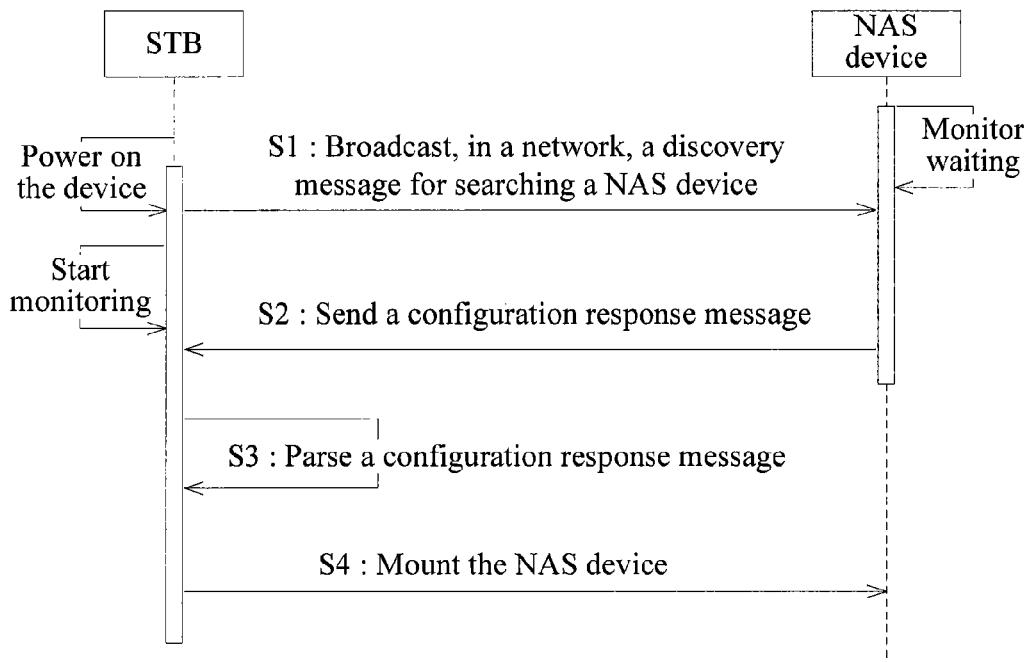
FIG. 2 is a schematic diagram of a process in which a NAS is online first, and after a DMP is online, the DMP actively searches and mounts the NAS device according to an embodiment of the present invention.

Specifically, as shown in FIG. 2, when an STB, that does not support a PVR and is used as a DMP, is powered on for connecting to a network, a NAS device in the network is actively searched at first by performing step S1. The searching method may be broadcasting a discovery message in the network, a format of the discovery message is as shown in the following table:

| Header | Identification Code A | IP | SN | Checksum |
|---|---|---|---|---|

Identification Code A in the message is an identification of the message, which indicates that the message is a discovery message, and is sent by the STB; IP indicates an IP address of the STB that sends the message; SN indicates a serial number of the STB that sends the message; and Checksum indicates a HASH value of all information excluding a header field and before this field, and is used to prevent forging of the message.

Step 12: The DMP parses a configuration response message sent by the NAS device according to the discovery message, and obtains configuration information of the NAS device.

Specifically, after receiving the discovery message by an online NAS device, as shown in FIG. 2, the online NAS device returns a configuration response message to the STB that sends the discovery message, by performing step S2, the configuration response message may be a message sent to a 54330 port of the STB through UDP unicast, and a format of the configuration response message is as shown in the following table:

| UDP Header | Identification Code C | | SN | Checksum | |
|---|---|---|---|---|---|
| Para Code1 | Para Len | Para Value | Para Code2 | Para Len | Para Value |

Identification Code C in the message is an identification of the message, which indicates that the message is a response message, and is sent by the NAS; SN indicates a serial number of the NAS device that sends the message; Checksum indicates a HASH value of all information excluding a header field before this field, and is used to prevent forging of the message; Para Code1 represents a following parameter name, for example, a URL for mounting, and a URL for configuring NAS; Para Len indicates a length of the parameter; and Para Value indicates a value of the parameter, which is transferred by means of ASCII codes.

After receiving the configuration response message sent by the NAS device, as shown in FIG. 2, the STB parses the configuration response message by performing step S3, and obtains configuration information of the NAS device, the configuration information carries the serial number of the NAS device, a URL address for mounting, and a URL address for configuring.

Step 13: The DMP mounts the NAS device according to the configuration information.

Specifically, after obtaining the configuration information, as shown in FIG. 2, the STB mounts the NAS device by performing step S4. Taking an example that a mounting manner is a NFS: The NAS device returns a URL address for mounting which is similar to "NFS://<host>:<port><url-path>", where if a default value of port is 2049, the value of port may not be carried; when mounting the NAS device, the STB needs to attach the serial number of the NAS at the back of the URL, and the corresponding serial number must be completely consistent with that filled in during broadcasting. Therefore, a complete URL address after mounting is NFS://<host>:<port><url-path>/<SN>.

After the mounting is completed, the STB continues to configure the NAS device through a URL address, because the NAS device returns the URL address for configuring that is similar to "http://<host>:<port><url-path>", where if a default value of port is 80, the value of the port may not be carried, and the parameter is used to open personally-recorded-video-contents or downloaded contents, where the personally-recorded video contents or the downloaded contents are shared on the NAS device, through browser jump when a user inputs a command "configure NAS device" in a configuration page.

Figure 3:
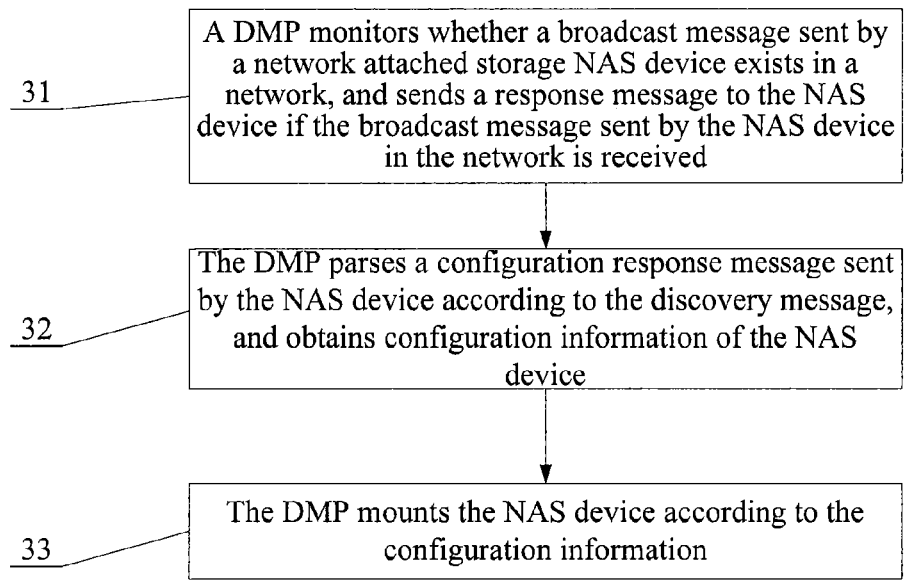
FIG. 3 is a schematic flow chart of another method for mounting a NAS device according to an embodiment of the present invention.

An embodiment of the present invention further provides another method for mounting a NAS device, as shown in FIG. 3, where the method includes:

Step 31: A DMP monitors whether a broadcast message sent by a network attached storage NAS device exists in a network, and sends a response message to the NAS device if the broadcast message sent by the NAS device in the network is received.

Specifically, in this embodiment, the corresponding NAS device may be a storage device which exists in the network and is used by other devices, and generally provides a standard network file service (for example, samba, NFS and so on). The corresponding DMP device may be a device that is connected to a home gateway and provides media content sharing to a home network, and in this embodiment, a STB that does not support a PVR is used as the DMP device for description.

Figure 4:
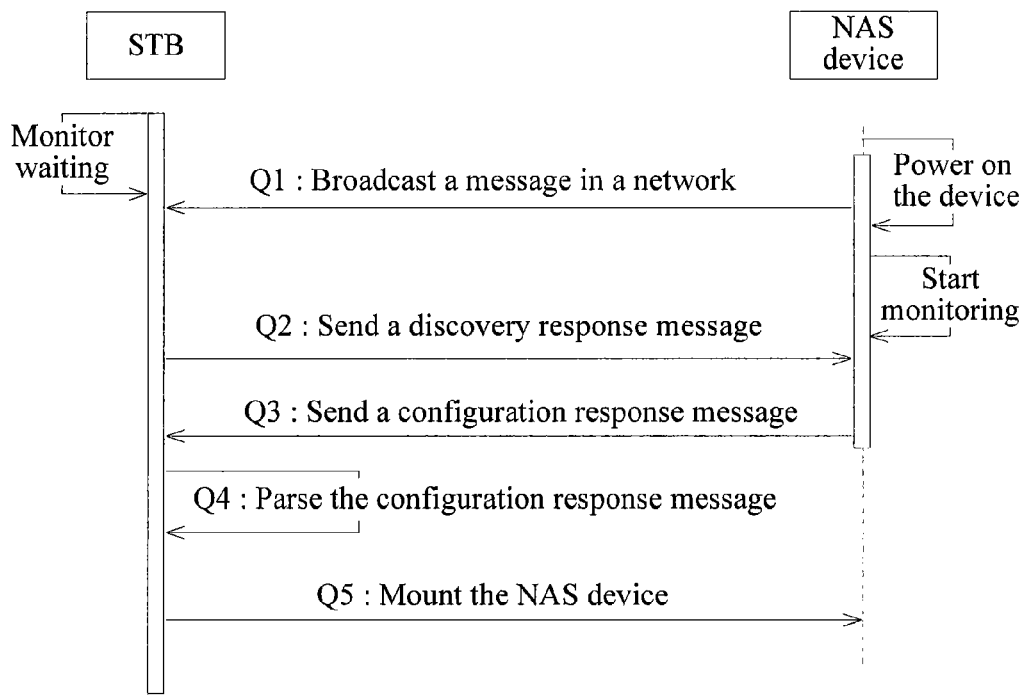
FIG. 4 is a schematic diagram of a process in which a DMP is online first, and after a NAS device is online, the DMP actively searches and mounts the NAS device according to an embodiment of the present invention.

As shown in FIG. 4, if the STB, which is used as a DMP and does not support the PVR, does not find an online NAS device after being powered on and connected to a network, the STB keeps monitoring a network state. When a NAS device is online in the network, a message is broadcasted in the network by performing step Q1, where a format of the broadcast message is as shown in the following table:

| Header | Identification Code B | IP | SN | Checksum |
| --- | --- | --- | --- | --- |

Identification Code B in the message is an identification of the message, which indicates that the message is a broadcast message, and is sent by the NAS device; IP indicates an IP address of the NAS device that sends the message; SN indicates a serial number of the NAS device that sends the message; and Checksum indicates a HASH value of all information excluding a header field before the header field, and is used to prevent forging of the message.

After receiving the broadcast message, as shown in FIG. 4, the STB sends a discovery response message to the NAS device that sends the broadcast message through step Q2, where a format of the discovery response message is the same as that of a broadcasted discovery message for actively searching the NAS device in the network.

Step 32: The DMP parses a configuration response message sent by the NAS device according to the discovery message, and obtains configuration information of the NAS device.

Specifically, after receiving the response message sent by the STB, as shown in FIG. 4, the NAS device returns a configuration response message to the STB that sends the discovery message by performing step Q3, where the configuration response message may be a message sent to a 54330 port of the STB through UDP unicast, and a format of the configuration response message is as shown in the following table:

| UDP Header | Identification Code C | | SN | Checksum | |
| --- | --- | --- | --- | --- | --- |
| Para Code1 | Para Len | Para Value | Para Code2 | Para Len | Para Value |

Identification Code C in the message is an identification of the message, which indicates that the message is a response message, and is sent by the NAS; SN indicates the serial number of the NAS device that sends the message; Checksum indicates the HASH value of all the information excluding a header before this field, and is used to prevent forging of the message; Para Code1 represents a following parameter name, for example, a URL for mounting, a URL for configuring by the NAS; Para Len indicates a length of the parameter; and Para Value indicates a value of the parameter, which is transferred by means of ASCII codes.

After receiving the configuration response message sent by the NAS device, as shown in FIG. 4, the STB parses the configuration response message by performing step Q4, and obtains configuration information of the NAS device, where the configuration information carries the serial number of the NAS device, a URL for mounting, a URL for configuring by the NAS.

Step 33: The DMP mounts the NAS device according to the configuration information.

Specifically, after obtaining the configuration information, as shown in FIG. 4, the STB mounts the NAS device by performing step Q5. Taking an example that a mounting manner is NFS: The NAS device returns a URL address for mounting that is similar to "NFS://<host>:<port><url-path>", where if a default value of port is 2049, the value of the port may not be carried; when mounting the NAS device, the STB needs to attach the serial number of the NAS at the back of the URL, and the corresponding serial number must be completely consistent with that filled in during broadcasting. Therefore, a complete URL address after mounting is NFS://<host>:<port><url-path>/<SN>.

After the mounting is completed, the STB continues to configure the NAS device through a URL address, because the NAS device returns the URL address for configuring that is similar to "http://<host>:<port><url-path>", where if a default value of port is 80, the value of the port may not be carried, and the parameter is used to open personally-recorded-video-contents or downloaded contents, where the personally-recorded video contents or the downloaded contents are shared on the NAS device, through browser jump when a user inputs a command "configure NAS device" in a configuration page.

Figure 5:
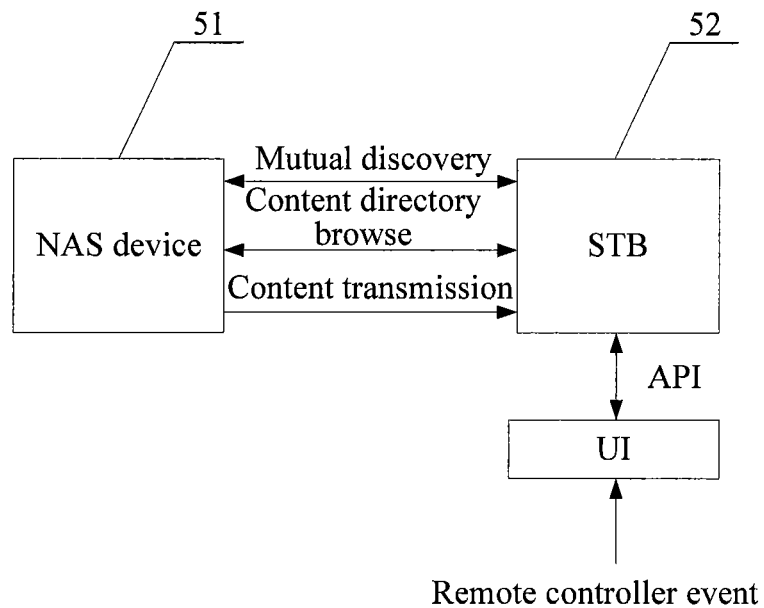
FIG. 5 is a schematic flow chart about controlling a STB to browse and play contents on a NAS device by a remote controller according to an embodiment of the present invention.

After the STB that does not support the PVR completes the mounting of the NAS device, reading of data such as images, audios, and videos that are stored in the NAS device can be realized. FIG. 5 is a schematic flow chart about controlling a STB 52 to browse and play contents on a NAS device 51 by a remote controller, so as to realize the sharing of personally-recorded-video-contents in the IPTV by the NAS device 51. First, when the STB 52 plays a recorded program in the NAS device 51, the STB 52, as defined by the DLNA, provides a UI (interface) for a user to browse contents. After receiving a remote controller event from the user, the UI invokes an API (Application Programming Interface, application programming interface) provided by the STB 52, triggers the STB 52 to retrieve a content directory in the NAS device 51 for browsing or playing. In FIG. 5, in a corresponding scenario, the NAS device 51 is a DMS device, which provides UPnP sharing of recorded contents to the STB 52; after the STB 52 and the NAS device 51 are mutually discovered through UPnP, a file list is displayed on the UI of the STB 52 by "content directory browse"; and when playing is started, connection is established between the STB 52 and the NAS device 51 by "connection management", and playing is controlled by "audio and video transmission management", so that out of band (not limited by the DLNA) transmission of the personally-recorded-video-contents is performed through a transmission manner of "connection management" negotiation.

Figure 6:
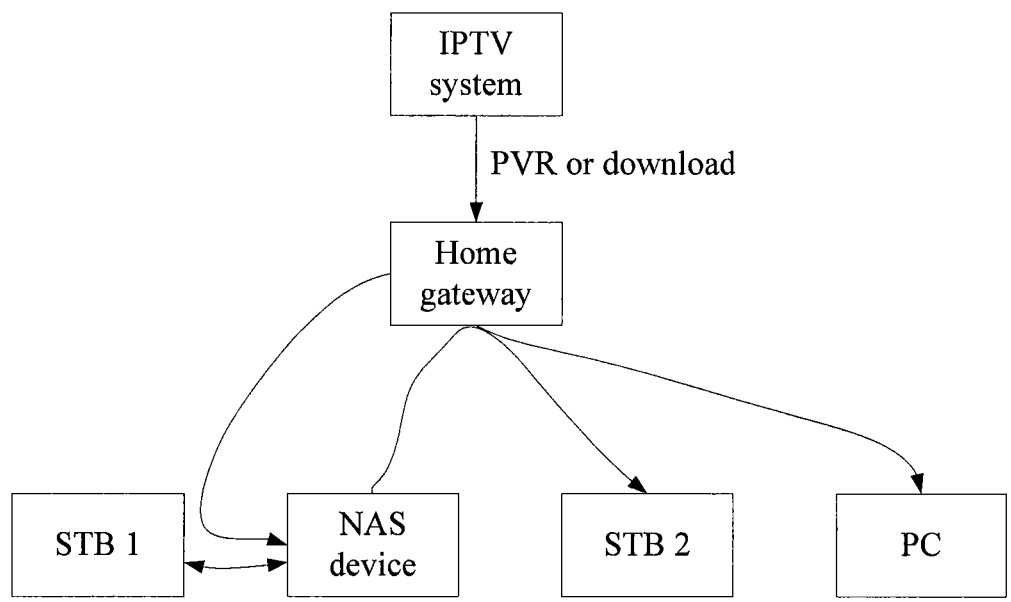
FIG. 6 is a schematic structural diagram of a personal-video-recorded-content sharing system based on a NAS device according to an embodiment of the present invention.

In a specific application scenario, for example, a personal-video-recorded-content sharing system based on a NAS device shown in FIG. 6, a corresponding module for mounting the NAS device is set in a STB 1. By setting a storage address to be the corresponding NAS device address, even if the STB 1 does not have a local storage function, a personal video recording or download service can also be provided to a user. A corresponding module for playing the media content is set in a STB 2 or a PC, which has the functions of discovering a device in a system and playing content. During playing the media content, a subject for triggering the obtaining of IPTV contents is still the STB 1; however, the STB 1 does not need a local hard disk any longer, but mounts the NAS device through NFS or samba, and writes the corresponding media content in the NAS device. When an interconnection solution of devices in the system is a solution defined by the DLNA, other devices such as the STB 2 or the PC may access personally-recorded-video-contents or downloaded contents, where the personally-recorded-video-contents or the downloaded contents are stored in the NAS device.

By using the technical solution according to this embodiment, the automatic mounting of the NAS device is realized by discovering and parsing the configuration information of the NAS device in the network, and the personally-recorded-video-contents or the downloaded media contents, where the personally-recorded video contents or the downloaded contents are stored in the NAS device, can be played according to the selection of a user in the case that local data storage is not supported, so as to enable a digital home user to obtain a better user experience.

Figure 7:
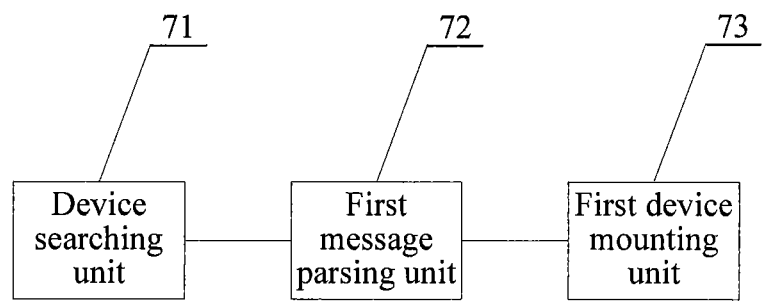
FIG. 7 is a schematic structural diagram of a digital media player DMP according to an embodiment of the present invention.

An embodiment of the present invention further provides a digital media player, as shown in FIG. 7, where the digital media player may specifically include a device searching unit 71, a first message parsing unit 72, and a first device mounting unit 73. The device searching unit 71 is configured to broadcast, in a network, a discovery message for searing a NAS device; the first message parsing unit 72 is configured to parse a configuration response message sent by the NAS device according to the discovery message, and obtain configuration information of the NAS device; and the first device mounting unit 73 is configured to mount the NAS device according to the configuration information.

Optionally, in the device searching unit 71, the discovery message carries an IP address of the DMP, a serial number of the DMP, and an identification of the discovery message.

Optionally, in the first message parsing unit 72, the configuration information carries a serial number used to identify and mount the NAS device, a URL address for mounting, and a URL address for configuring.

By using the technical solution according to this embodiment, the automatic mounting of the NAS device is realized by discovering and parsing the configuration information of the NAS device in the network, and personally-recorded-video-contents or downloaded media contents, where the personally-recorded-video-contents or the downloaded media contents are stored in the NAS device, can be played according to the selection of a user in the case that local data storage is not supported, so as to enable a digital home user to obtain a better user experience.

Figure 8:
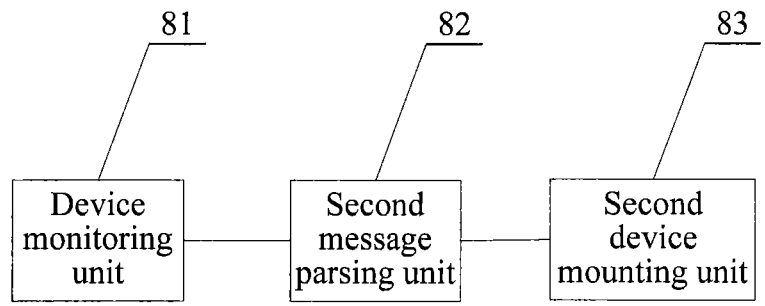
FIG. 8 is a schematic structural diagram of another digital media player DMP according to an embodiment of the present invention.

An embodiment of the present invention further provides a digital media player. As shown in FIG. 8, the digital media player includes a device monitoring unit 81, a second message parsing unit 82, and a second device mounting unit 83. The device monitoring unit 81 is configured to monitor whether a broadcast message sent by a network attached storage NAS device exists in a network, and send a response message to the NAS device if the broadcast message sent by the NAS device in the network is received; the second message parsing unit 82 is configured to parse a configuration response message sent by the NAS device according to the discovery message, and obtain configuration information of the NAS device; and the second device mounting unit 83 is configured to mount the NAS device according to the configuration information.

Optionally, in the device monitoring unit 81, the discovery message carries an IP address of the DMP, a serial number of the DMP, and an identification of the discovery message.

Optionally, in the second message parsing unit 82, the configuration information carries a serial number used to identify and mount the NAS device, a URL address for mounting, and a URL address for mounting.

By using the technical solution according to this embodiment, the automatic mounting of the NAS device is realized by discovering and parsing the configuration information of the NAS device in the network, and personally-recorded-video-contents or downloaded media contents, where the personally-recorded video contents or the downloaded media contents are stored in the NAS device, can be played according to the selection of a user in the case that local data storage is not supported, so as to enable a digital home user to obtain a better user experience.

Implementation manners of processing functions of units included in the digital media player have been described in the foregoing method embodiments, and are not repeatedly described here.

It should be noted that in the foregoing module embodiments, the included units are divided only according to logical functions, but the present invention is not limited to the division, as long as corresponding functions can be realized; in addition, specific names of the function units are provided merely for the purpose of distinguishing the units from one another, but not intended to limit the scope of the present invention.

The foregoing descriptions are merely exemplary specific embodiments of the present invention, but not intended to limit the scope of the present invention. All variations or replacements that can be easily thought of by those skilled in the art within the technical scope of the present invention should fall within the protection scope of the present invention. Therefore, the protection scope of the present invention is defined by the protection scope of the claims.

What is claimed is:

1. A method for mounting a network attached storage (NAS) device, comprising:
    broadcasting, by a digital media player (DMP), in a network a discovery message for searching a network attached storage (NAS) device;

parsing, by the DMP, a configuration response message, which is sent by the NAS device according to the discovery message, and obtaining configuration information of the NAS device, wherein the configuration information carries a serial number used to identify the NAS device, a URL address for mounting, and a URL address for configuring; and mounting, by the DMP, the NAS device according to the serial number and the URL address for mounting and after the mounting is completed, configuring the NAS device according to the URL address for configuring.

2. The method according to claim 1, wherein the discovery message carries an IP address of the DMP, a serial number of the DMP, and an identification of the discovery message.

3. A digital media player (DMP), comprising:
   a transceiver, configured to broadcast, in a network, a discovery message for searching a network attached storage (NAS) device;
   a hardware processor, configured to implement a processing function to parse a configuration response message, which is sent by the NAS device according to the discovery message, and obtain configuration information of the NAS device, wherein the configuration information carries a serial number used to identify the NAS device, a URL address for mounting, and a URL address for configuring; and
   the hardware processor further configured to mount the NAS device according the serial number and the URL address for mounting and after the mounting is completed, configuring the NAS device according to the URL address for configuring.

4. The DMP according to claim 3, wherein the discovery message carries an IP address of the DMP, a serial number of the UMP, and an identification of the discovery message.

5. A method for mounting a network attached storage (NAS) device, comprising:
   monitoring, by a digital media player (DMP), whether a broadcast message sent by a network attached storage (NAS) device exists in a network, and sending a response message to the NAS device if the broadcast message sent by the NAS device in the network is received;
   parsing, by the DMP, a configuration response message sent by the NAS device according to the response message, and obtaining configuration information of the NAS device, wherein the configuration information carries a serial number used to identify the NAS device, a URL address for mounting, and a URL address for configuring; and
   mounting, by the DMP, the NAS device according: to the serial number and the URL address for mounting and after the mounting is completed, configuring the NAS device according to the address for configuring.

6. The method according to claim 5, wherein the broadcast message carries an IP address of the DMP, a serial number of the DMP, and an identification of the broadcast message.

7. A digital media player (DMP), comprising:
   a transceiver, configured to monitor whether a broadcast message sent by a network attached storage (NAS) device exists in a network, and send a response message to the NAS device if the broadcast message sent by the NAS device in the network is received;
   a hardware processor, configured to implement a processing function to parse a configuration response message, which is sent by the NAS device according to the response message, and obtain configuration information of the NAS device, wherein the configuration information carries a serial number used to identify the NAS device, a URL address for mounting, and a URL address for configuring; and
   the hardware processor is further configured to mount the NAS device according to the serial number and the URL address for mounting and after the mounting is completed, configuring the NAS device according to the URL address for configuring.

8. The DMP according to claim 7, wherein the broadcast message carries an IP address of the DMP, a serial number of the DMP and an identification of the broadcast message.

* * * * *

UNITED STATES PATENT AND TRADEMARK OFFICE
CERTIFICATE OF CORRECTION

PATENT NO. : 9,118,497 B2  
APPLICATION NO. : 13/482337  
DATED : August 25, 2015  
INVENTOR(S) : Guohua Shen Page 1 of 1

It is certified that error appears in the above-identified patent and that said Letters Patent is hereby corrected as shown below:

In the claims,

Claim 4, Column 9, Line 35

Delete "UMP," and insert --DMP,--, therefor.

Signed and Sealed this
First Day of December, 2015

Michelle K. Lee
*Director of the United States Patent and Trademark Office*